United States Patent [19]
Connelly et al.

[11] 3,943,974
[45] Mar. 16, 1976

[54] CONTROL VALVE FOR FLUID ACTUATOR

[75] Inventors: Lawrence K. Connelly, River Ridge, La.; Clifford M. Peters, Longview, Tex.

[73] Assignee: ACF Industries, Incorporated, New York, N.Y.

[22] Filed: Mar. 24, 1975

[21] Appl. No.: 560,768

[52] U.S. Cl. .......... 137/624.27; 251/89; 137/625.66
[51] Int. Cl.² ........................................... F16K 31/00
[58] Field of Search.......... 137/624.27, 625.69, 463, 137/464, 465; 251/14, 73, 89

[56] References Cited
UNITED STATES PATENTS
3,823,739   7/1974   McMullan...................... 137/624.27

*Primary Examiner*—Alan Cohan

[57] ABSTRACT

A control valve for a fluid actuator has a slide valve member mounted within a housing with an external knob on one end and a piston on the other end. The knob may be manually operated for resetting the piston. When the main flowline pressure reaches a high or low pressure outside the fluid pressure operating range the piston is seated and fluid is exhausted from the actuator for effecting movement of the main valve member. The control valve is maintained in its exhaust position by a spring continuously urging the piston into a seated position. An annular seal engages the face of the piston in seated position to expose only a relatively small surface area of the piston to fluid pressure when the piston is seated and the control valve is in an exhaust position. Means are provided to permit a venting or bleeding of fluid around the piston in the seated position of the piston in the event of leakage of fluid past the annular seal or temporary unseating of the piston resulting from vibrations or the like.

8 Claims, 4 Drawing Figures

CONTROL VALVE FOR FLUID ACTUATOR

BACKGROUND OF THE INVENTION

U.S. Pat. no. 3,823,739 dated July 16, 1974 is directed to a fail-safe lock-out control valve for a pneumatic actuator and may be manually operated to lockout a slide valve member until the operating fluid pressure reaches predetermined operating range. When the fluid pressure reaches a high or low pressure outside the operating range, the piston shown in U.S. Pat. No. 3,823,739 moves to a seated position to exhaust fluid from the actuator, and a separate locking member engages the piston to retain the piston positively in seated position to prevent any movement of the piston out of exhaust position until the locking member is manually released. In the event of the malfunctioning or inoperability of the locking member for holding the piston in seated position, vibrations or the like might effect unseating of the piston to a position in which fluid pressure may again be supplied to the actuator for the main valve to move the main valve to an open position. This could result in a possible safety hazard.

Also, in copending application Ser. No. 380,830, of Clifford M. Peters filed July 19, 1973 for "Pressure Controller," an arrangement is disclosed similar to that shown in the above mentioned U.S. Pat. No. 3,823,739 in that a separate manually controlled locking means for the piston is provided so that upon movement of the piston to the down or seated position, the locking means holds the piston in its seated position until the locking means is manually withdrawn. If desired, the locking means may be rotated to an inoperable position out of engagement with the piston and this could result in a safety hazard if the locking means is inadvertently retained in an inoperable position as vibrations or a leakage of fluid in the piston chamber when the piston is in a seated position might move the piston to an up position in which fluid is supplied to the actuator for moving the main flowline valve member to an open position.

BRIEF DESCRIPTION OF PRESENT INVENTION

The present invention is directed to a control valve for a fluid actuator in which means are provided to automatically retain the piston in its down seated position even though vibrations or fluid leakage might temporarily unseat the piston. The control valve has a slide valve member with a piston on one end thereof and does not require any separate locking means to lock or secure the piston in a down or seated position after the piston is initially seated and the main flowline valve has moved to a closed position. The piston is mounted within an enlarged diameter portion of a bore in the valve body and seats on an abutment defined by the bore under the urging of a compression spring. The piston moves to its seated position when the fluid pressure is outside a predetermined operating range and must be reset before the main valve is opened. The outer face of the piston is exposed to fluid pressure from a port leading to the piston chamber. An annular resilient seal about the port through which fluid pressure acts against the outer face of the piston forms a sealing engagement with the outer face of the piston when the piston is in a seated position on the abutment thereby exposing only a relatively small surface area of the piston to fluid pressure in such seated position. A vent in the housing communicates with the bore adjacent the inner face of the piston and bypass bleed means are provided to permit fluid pressure to be bled or leaked around the piston to the vent from the seated position of the piston. This is desirable in the event leakage past the annular seal occurs such as might result from vibrations or the like.

The specific means employed for bleeding fluid around the piston comprises an enlarged diameter section in the piston chamber immediately adjacent the abutment so that space is provided between the piston and the adjacent wall of the bore when the piston is in a seated position on the abutment. In this manner, any fluid pressure leaking around the seal or any initial unseating of the piston member would result in the fluid pressure being vented around the piston thereby allowing the piston under the bias of the spring to immediately return to its original seated position. Since the piston is not in frictional engagement with the adjacent surface formed by the enlarged diameter section in its seated position, the spring is highly efficient in returning the piston to a seated position on the abutment upon any leakage or fluid or the like.

Figure 1:
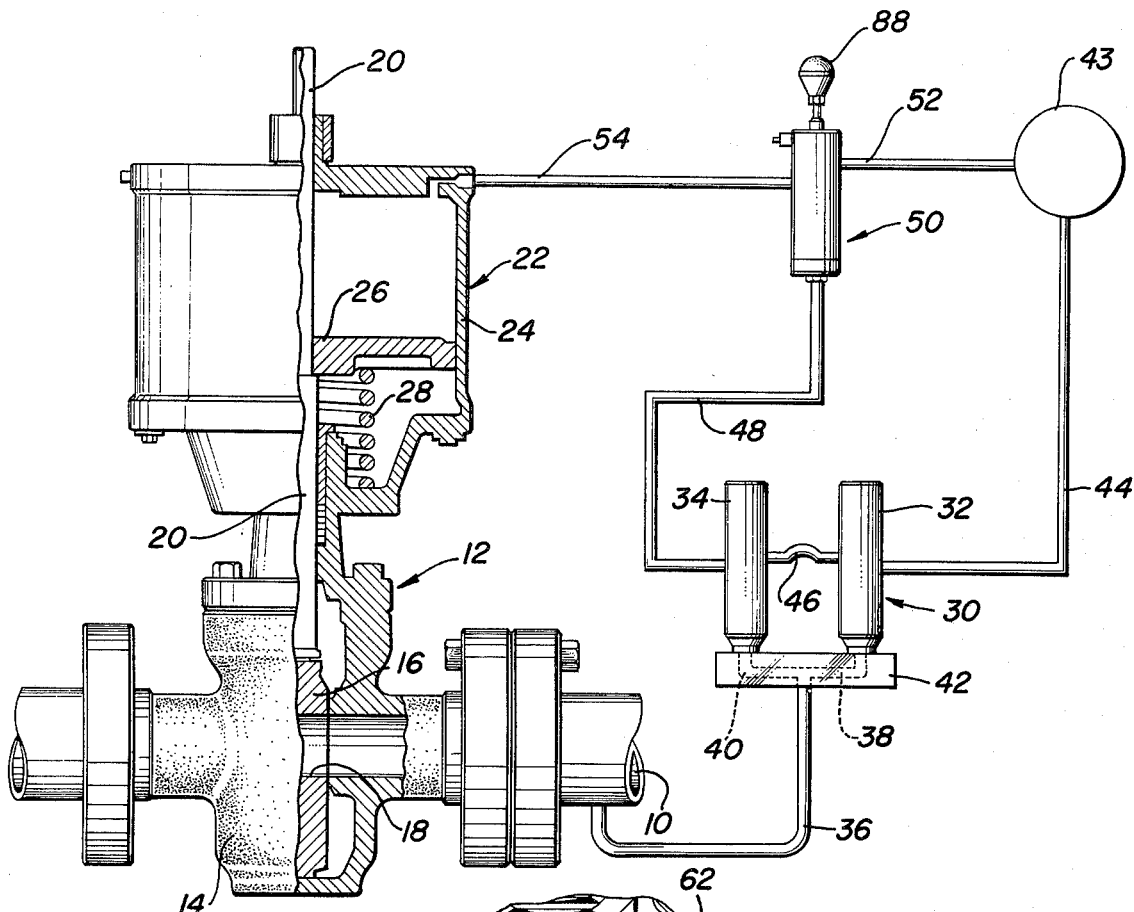
FIG. 1 is a diagramatic view showing the system in which the present invention is employed with a fluid actuator and gate valve being controlled by the system.

Referring now to the drawing for a better understanding of this invention, and more particularly to FIG. 1, a main flowline indicated at 10 has a gate valve structure generally indicated at 12 therein. Gate valve body 14 has a slab gate 16 mounted therein with an opening 18 in slab gate 16 movable between open and closed positions relative to flowline 10. A stem indicated at 20 is connected to slab gate 16 and extends upwardly through a pneumatic actuator indicated generally at 22. Pneumatic actuator 22 includes a cylinder 24 having a piston 26 mounted therein and secured to stem 20 for reciprocal movement within cylinder 24. A spring 28 mounted within cylinder 24 continuously urges piston 26 and gate valve member 16 to a closed position.

A high-low pilot structure is generally indicated at 30 and includes a high pressure pilot 32 and a low pressure pilot 34. Pressure in flowline 10 is sensed through pilot line 36 and through branch line 38 to high pressure pilot 32 and branch line 40 to low pressure pilot 34. Pilots 32 and 34 are supported on a base 42. Each pilot 32, 34 has a shiftable valve member therein and a spring urging the valve member in one direction. A fluid source 43, such as a pressurized cylinder of oxygen or nitrogen gas, is connected by line 44 to high pressure pilot 32, thence by a connecting line 46 to low pressure pilot 34, and by line 48 to the control valve structure 50. High pressure pilot 32 may be set to be actuated at a predetermined high pressure in flowline 10 and low pressure pilot 34 may be set to be actuated at a predetermined low pressure in flowline 10. Thus, an operating fluid pressure range is provided between the low pressure at which low pressure pilot 34 is set and the high pressure at which high pressure pilot 32 is set. In the event the fluid pressure in flowline 10 reaches a pressure lower than the pressure at which low pressure pilot 34 is set the pressurized gas within line 46 to low pressure pilot valve 34 is interrupted and exhausted to atmosphere thereby to interrupt the fluid pressure in line 48 to control valve 50.

Likewise, when a predetermined high pressure is reached outside the operating range at which high pressure pilot 32 is set, fluid in line 44 supplied to high pressure valve 32 is exhausted to atmosphere thereby to interrupt the fluid pressure in line 48 to fluid control valve 50. For further details of the operation of pilot valve structure 30, reference is made to my prior U.S. Pat. No. 3,043,331 issued July 10, 1962 the entire disclosure of which is incorporated by this reference.

Fluid, preferably pressurized gas, is supplied from source 43 through line 52 to control valve 50 and thence through line 54 to actuator 22. The pressurized gas is supplied continuously to actuator 22 as long as lines 52 and 54 are in fluid communication with each other through control valve 50 and piston 26 remains in the position shown in FIG. 1 in which slab gate 16 is in an open position. When the flow of fluid is interrupted by control valve 52 to line 54, and fluid is exhausted from line 54 through control valve 50 as will be explained in detail later, piston 26 will move to its up position under the bias of spring 28 and slab gate 16 will move to a closed position relative to flowline 10 thereby to shut off fluid flow through flowline 10.

Figure 4:
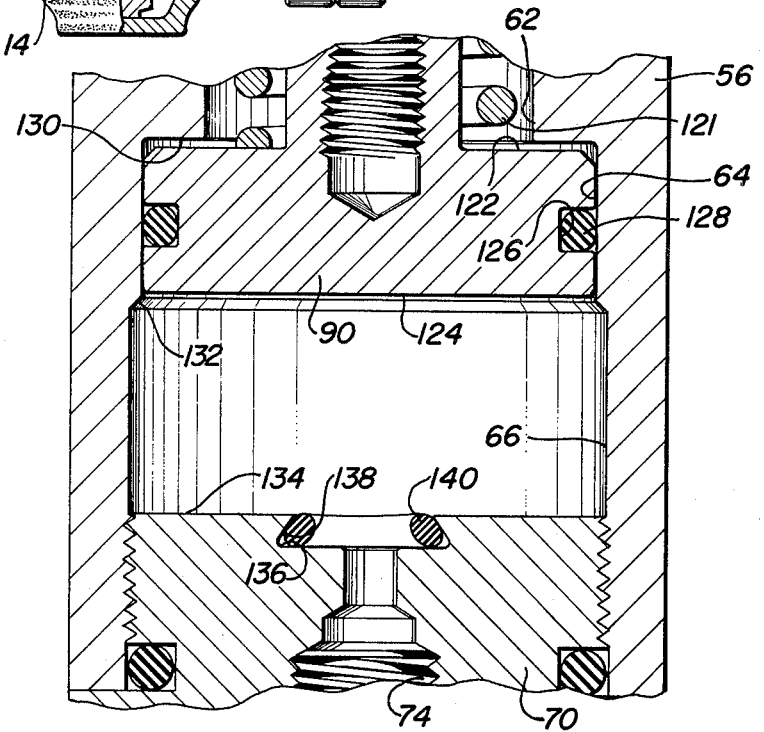
FIG. 4 is an enlarged segment of FIG. 3 showing the dual diameter piston chambers and the annular sealing means for the piston.
Figure 2:
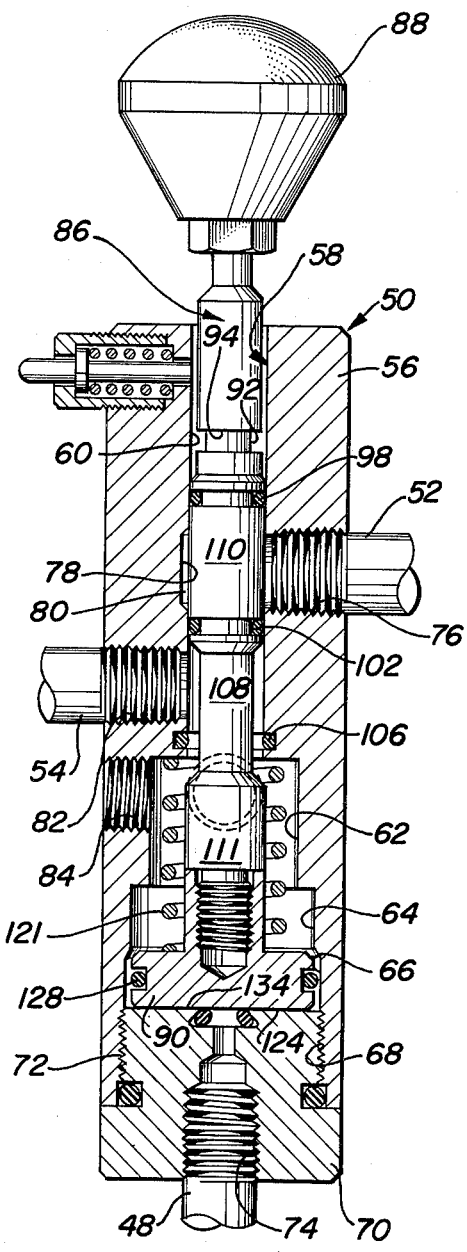
FIG. 2 is a sectional view of the control valve comprising the present invention with the piston being shown in its down seated position.
Figure 3:
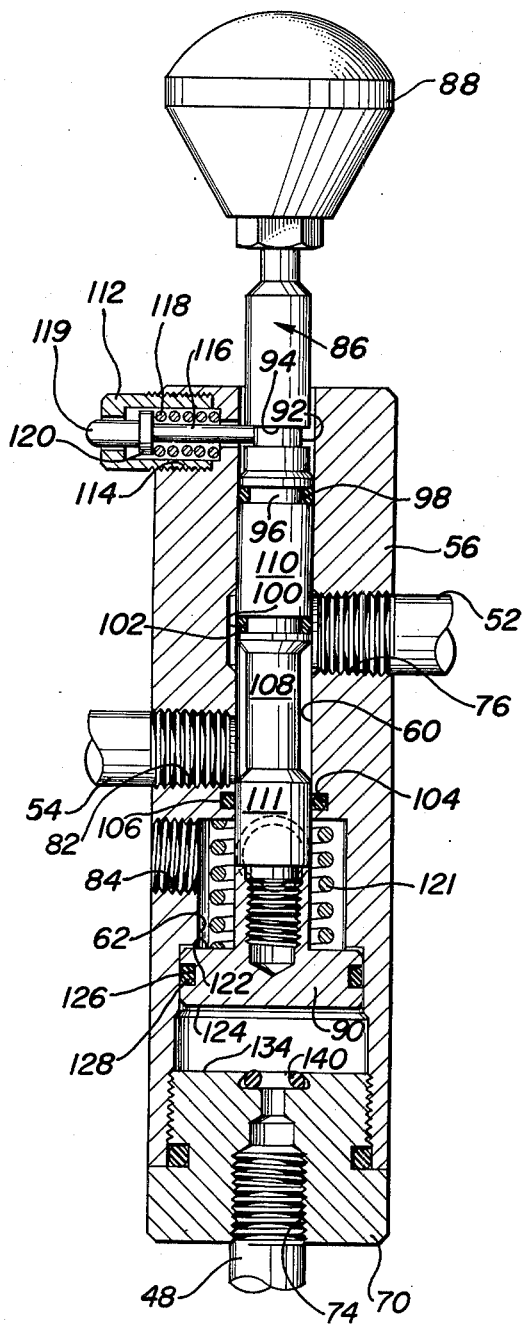
FIG. 3 is a sectional view similar to FIG. 2 but showing the piston in a reset position.

Referring now more particularly to FIGS. 2–4 in which control valve 50 comprising the present invention is shown in detail, a housing 56 forming the main body is provided and has a longitudinal bore generally indicated at 58 including a main bore 60 of reduced diameter, an intermediate bore 62 of an intermediate diameter, and enlarged diameter portions 64 and 66. The lower end of housing 56 has internal screw threads 68 formed therein and an externally threaded end plug 70 has external screw threads 72 which engage internal threads 68. A central bore 74 is provided in end plug 70 and line 48 is threaded within bore 74.

Housing 56 has an inlet port 76 therein in which line 52 is threaded. Inlet port 76 communicates with main bore 60 and an enlarged diameter portion 78 adjacent port 76 provides pressurized gas in chamber 80 formed thereby. An outlet port 82 is formed in housing 56 and line 54 is connected thereto for supplying pressurized gas to actuator 22. A vent 84 is in fluid communication with intermediate bore portion 62 while outlet 82 is in communication with main bore 60.

A slide valve is indicated generally at 86 and has a knob 88 adjacent an outer end thereof which may be manually gripped for actuating slide valve 86 as will be explained. A piston generally indicated 90 is secured adjacent the inner end of slide valve 86 and is mounted within enlarged bore portions 64 and 66 for movement. The main body of slide valve 86 has an annular groove 92 therein adjacent knob 88. Annular groove 92 forms an upper abutting surface 94. An annular groove 96 in slide valve 86 has an O-ring 98 mounted therein for engagement with the adjacent surface of main bore 60. Likewise, an annular groove 100 has an O-ring 102 therein for engagement with the surface defining main bore 60. An annular groove 104 in housing 56 receives an O-ring 106 therein. Slide valve 86 has a reduced diameter center section 108 positioned between two adjacent end sections 110 and 111.

FIG. 3 shows slide valve 86 in an out position in which position slide valve 86 remains until the fluid pressure in line 48 builds up to a predetermined amount. To retain slide valve 86 in the position of FIG. 3, a cap 112 is threaded within an internally threaded opening 114 in housing 56. A plunger or detent 116 is mounted within cap 112 and a spring 118 engages a flange 120 on plunger 116 to urge continuously plunger 116 to a position out of engagement with annular groove 92. The inner end of plunger 116 engages abutment 94 when received within groove 92 and outer end 119 of plunger 116 extends outwardly through an opening in cap 112. Plunger 116 is depressed inwardly manually by pushing in on end 119 until the inner end of plunger 116 is received within groove 92 and held in its inner position by frictional contact with adjacent abutment 94.

To hold plunger 116 in engagement with abutment 94, a spring 121 is mounted within intermediate diameter portion 62 and engages inner face 122 of piston 90. An outer face 124 of piston 90 is provided adjacent or opposite inner face 122 and the outer circumferene of piston 90 has an annular groove 126 therein receiving an O-ring 128.

As shown particularly in FIG. 4, an annular ledge 130 is provided between intermediate bore 62 and enlarged diameter portion 64. A frusto conical surface 132 connects enlarged diameter bore portions 64 and 66. An abutment 134 is arranged adjacent an end of enlarged diameter bore portion 66 and face 124 of piston 90 seats on abutment 136 in the closed or in position of slide valve 86 as shown in FIG. 2. It is noted that abutment 130 is spaced slightly from the adjacent inner face 122 of piston 90 in the position of FIGS. 3 and 4 in which slide valve 86 is held in an out position by detent or plunger 116. This position is maintained until fluid pressure in line 48 reaches a predetermined amount at which time piston 90 is urged upwardly against the bias of spring 121 thereby to space abutment 94 slightly from detent 116 releasing detent 116 under the bias of spring 118. When plunger 116 is released, control valve 50 becomes operable and piston 90 remains in the position shown in FIGS. 3 and 4 so long as the fluid pressure within line 48 acting against face 124 of piston 90 remains at a predetermined amount.

It is noted that the entire face 124 is exposed to fluid pressure from line 48 in the position of FIGS. 3 and 4. In order to expose only a relatively small surface area of face 124 to fluid pressure in line 48, a recess 136 is provided in ledge or abutment 134 and is defined by a tapered annular wall surface 138 in which an O-ring 140 is positioned. The tapered wall surface 138 serves to retain O-ring 140 in position and as shown in FIG. 2 when piston 90 is in a seated position on ledge 134, O-ring 140 is in engegement with face 124 of piston 90. Thus only the area defined within O-ring 140 is exposed to fluid pressure, from line 48 in the seated position of piston 90.

In operation, from the seated position of piston 90 shown in FIG. 2 in which the flow of fluid pressure from inlet 76 to outlet 82 is blocked by O-ring 102 and end portion 110, fluid communication is provided between line 54 and port 84 by reduced diameter portion 108 to bleed gas from actuator 22 for movement of slab gate 16 to a closed position. For resetting piston 90, knob 88 is gripped and slide valve 86 is moved outwardly against the bias of spring 120 with detent 116 being manually depressed within groove 92. In the position of FIG. 3, inlet 76 is in fluid engagement with outlet 82 about the reduced diameter portion 108 of slide valve 86, and fluid communication between outlet 82 and vent 84 is blocked by O-ring 108 and enlarged end portion 112 of slide valve 86. Gas is thus supplied to cylinder 24 and actuator 22 to move piston 26 downwardly to align opening 18 with flowline 10. Slide valve 86 remains in the position of FIG. 3 until fluid pressure in line 48 reaches a predetermined high amount at which time fluid pressure acting against face 124 of piston 90 moves piston 90 slightly upwardly to permit release of detent 116 under bias of spring 118. In this position, slide valve 86 is in operable position and fluid pressure is maintained to actuator 22 to hold gate valve member 16 in an open position.

In the event high pressure pilot 32 or low pressure pilot 34 is actuated by a respective high pressure or a respective low pressure, fluid supplied to line 48 is exhausted to atmosphere and the fluid pressure is reduced to atmosphere in line 48. When this occurs, piston 90 under bias of spring 121 moves to the seated position of FIG. 2 and the pressurized gas in line 54 is exhausted to atmosphere through bleed port or vent 84 thereby to permit gate valve 16 to move to a closed position under bias of spring 28. It is noted that O-ring 128 is in engagement with the adjacent surface defining enlarged bore portion 64 when piston 90 is in the position of FIG. 3 but upon movement of piston 90 to seated position on ledge 134, O-ring 128 is out of engagement with the adjacent surface defining enlarged bore portion 66 and spring 121 is highly effective since the sliding friction of O-ring 128 is removed. Thus, piston 90 is quick acting upon such an occasion.

It is noted that no separate means are provided to hold piston 90 in the seated position on ledge 134. However, only a small surface area of piston 90 in seated position is exposed to fluid pressure from line 48 and orifice 142 tends to balance the flow of fluid to piston face 124. In the event of vibrations or the like with any fluid leaking past O-ring 140, the fluid may bypass or go around piston 90 in the open area formed by enlarged bore portion 66 and be bled to atmosphere through vent 84. In this arrangement, piston 90 is only temporarily unseated for a relatively small period of time as spring 121 immediately reseats piston 90 upon such leakage of fluid from vent 84 around piston 90 thereby to maintain slide valve 86 in the position shown in FIG. 2 without any separate locking means being required for piston 90.

It is to be understood that other various types of means might be provided to permit the fluid to bypass piston 90 upon any leakage of fluid past O-ring 140 such as a separate port around piston 90, for example.

What is claimed is:

1. A control valve structure for controlling fluid communication between a first fluid pressure source and a main valve actuator, said control valve structure comprising an elongated housing having a bore extending longitudinally thereof and a slide valve mounted within the bore for longitudinal movement, said slide valve having an external knob on one end and a piston on the other end, a spring urging the slide valve inwardly to a seated position of the piston, a detent to hold the slide valve in an out position when the knob is manually gripped and the slide valve is moved to the out position against the bias of the spring, port means in fluid communication with said bore and exposing the outer face of the piston to fluid pressure, means urging the detent out of engagement with the slide valve and releasing the slide valve when the outer face of the piston is exposed to a predetermined high pressure from said port means, and a resilient annular seal between the port means and the outer face of the piston exposing only a relatively small surface area of the piston to fluid pressure from said port means when the piston is in a seated position, said annular seal permitting the entire outer face of said piston to be exposed to fluid pressure from said port means when the piston is out of seated position.

2. A control valve structure as set forth in claim 1 wherein said bore defines an annular abutment on which the piston seats in a seated position, and said port means comprises an opening positioned centrally with respect to the annular abutment, said annular seal positioned about said opening in the seated position of the piston.

3. A control valve structure as set forth in claim 1 wherein said bore defines an abutment on which the outer face of the piston seats, said abutment having a central annular recess therein defining a generally frusto-conical annular wall surface, and said annular seal comprises an O-ring positioned within said recess and retained in position by said frusto-conical wall surface, said O-ring engaging in sealing relation the outer face of the piston in the seated position thereof.

4. An improved control valve structure of the type in which an elongated housing has a bore extending longitudinally thereof and a slide valve having an external knob on its outer end and a piston on its inner end is mounted within the bore for longitudinal movement, wherein the improvement comprises:
 a spring urging the slide valve inwardly to a seated position of the piston;
 a detent to hold the slide valve in an unseated position when the slide valve is moved to the unseated position against the bias of the spring;
 port means in fluid communication with said bore and exposing the piston to fluid pressure;
 means urging the detent out of engagement with the slide valve and releasing the slide valve when the piston is exposed to a predetermined high fluid pressure from said port means;
 sealing means between the port means and the outer face of the piston exposing only a relatively small surface area of the piston to fluid pressure from said port means in the seated position of the piston, said sealing means in the unseated position of the piston permitting a substantially larger surface area of the piston to be exposed to fluid pressure from said port means; and
 fluid bypass means upon passage of fluid past said sealing means from said port means in the seated position of the piston to permit fluid to bypass the piston for relieving the fluid pressure acting against the sealing means.

5. An improved control valve structure as set forth in claim 4 wherein said sealing means comprises an O-ring, and said bore defines an annular abutment on which the piston seats in a seated position, said O-ring sealing between the annular abutment and the outer face of the piston in seated position.

6. An improved control valve structure as set forth in claim 5 wherein said port means comprises an opening positioned centrally with respect to the annular abutment, said annular abutment having a central recess therein adjacent said opening and receiving said O- ring.

7. A control valve structure for controlling fluid communication between a first fluid pressure source and a main valve actuator mechanism, and being responsive through pilot valve means to a predetermined pressure range in a main flowline; said control valve structure comprising:

an elongated housing having a bore extending longitudinally thereof;

a slide valve mounted within the bore for longitudinal movement and having a piston adjacent one end thereof mounted within an enlarged diameter portion of said bore, first spring means continuously urging the slide valve in a down direction, manual gripping means adjacent the other end of said slide valve to permit the slide valve to be gripped and moved manually to an out direction opposite the urging of said first spring means;

first port means including inlet and outlet ports in said housing for communicating fluid from a pressure source through the housing to the actuator mechanism;

second port means communicating with the enlarged diameter portion of said bore and responsive through the pilot valve means to fluid pressure in the main flowline outside the predetermined operating pressure range, said second port means communicating fluid pressure from the pressure source to said piston and maintaining the slide valve in a position permitting fluid pressure to be supplied through the control valve structure to the actuator mechanism when the pressure within the flowline is within the predetermined operating pressure range;

the enlarged diameter portion of the bore having an abutment on which said piston seats in a down position under the urging of said first spring means when the flowline fluid pressure is outside the predetermined operating range, an annular resilient seal about the second port means in the seated position of the piston and exposing only a relatively small surface area of the outer face of the piston to fluid pressure from said second port means when the piston is in seated position;

a vent in said housing communicating with the bore adjacent the inner face of said piston;

fluid bypass means upon any initial unseating of the piston from seated position on said abutment to permit the fluid pressure from pressure in said second port means to be vented around the piston and through said vent whereby said piston returns a seated position under the bias of said first spring means;

and manual detent means to hold said slide valve in an out position until a predetermined high pressure is obtained in said second port means, said manual detent means including a detent manually depressible inwardly to engage the slide valve and hold the slide valve in the out position adjacent the bias of said first spring means, and second spring means continuously urging the detent outwardly whereby upon the reaching of a predetermined high pressure in said second port means the slide valve is moved out of engagement with the detent and the detent is released under the bias of said second spring means.

8. A control valve structure as set forth in claim 7 wherein said fluid bypass means comprises a dual diameter piston chamber formed in said enlarged diameter portion of said bore, said dual diameter piston chamber comprising a small diameter chamber and a large diameter chamber, said piston having an O-ring extending about its outer peripheral surface in engagement with the wall surface defining the small diameter chamber when in its up position and out of engagement with the wall surface defining the large diameter chamber when in a down seated position.

* * * * *

UNITED STATES PATENT OFFICE
CERTIFICATE OF CORRECTION

Patent No. 3,943,974　　　　　　　　Dated　March 16, 1976

Inventor(s)　Lawrence K. Connelly et al.

It is certified that error appears in the above-identified patent and that said Letters Patent are hereby corrected as shown below:

Column 1, line 5, "u.S. Pat.no." should read

-- U. S. Pat. No. --. Column 2, line 22, "or", first occurrence, should read -- of --. Column 4, line 55, "engegement" should read -- engagement --.

Signed and Sealed this

Twenty-seventh Day of July 1976

[SEAL]

Attest:

RUTH C. MASON
*Attesting Officer*

C. MARSHALL DANN
*Commissioner of Patents and Trademarks*